United States Patent [19]

Degelman et al.

[11] Patent Number: 5,477,930
[45] Date of Patent: Dec. 26, 1995

[54] MECHANISM FOR ADJUSTING THE HEIGHT OF A FRAME OF AN AGRICULTURAL IMPLEMENT RELATIVE TO A GROUNDSURFACE

[75] Inventors: Wilfred J. Degelman, Raymore; Miles Evans, Regina, both of Canada

[73] Assignee: Degelman Industries Ltd., Regina, Canada

[21] Appl. No.: 263,238

[22] Filed: Jun. 21, 1994

[51] Int. Cl.$^6$ ..................................................... A01B 63/22
[52] U.S. Cl. ............................................ 172/417; 172/386
[58] Field of Search ......................... 172/414, 413, 172/417, 427, 429, 311, 421, 386, 484, 776; 111/164, 194, 52, 926; 280/43.23

[56] References Cited

U.S. PATENT DOCUMENTS

| | | | |
|---|---|---|---|
| 2,684,021 | 7/1954 | Ratzlaff | 172/427 X |
| 3,783,950 | 11/1974 | Geurts | 172/417 X |
| 4,119,156 | 10/1978 | Wheeler et al. | 172/417 X |
| 4,373,456 | 2/1983 | Westerfield | 172/427 X |
| 4,506,609 | 3/1985 | Fuss et al. | 172/417 X |
| 4,509,603 | 4/1985 | Adams | 172/427 |
| 4,520,876 | 6/1985 | Peterson et al. | 172/427 |
| 5,052,495 | 10/1991 | McFarlane et al. | 172/417 X |

FOREIGN PATENT DOCUMENTS 968727  7/1948  France .

Primary Examiner—Terry Lee Melius
Assistant Examiner—Robert Pezzuto
Attorney, Agent, or Firm—Anthony R. Lambert

[57] ABSTRACT

A mechanism for adjusting the height of a frame of an agricultural implement relative to a groundsurface is described. A parallelogram frame is provided which includes a frame mounted member and a wheel mounting member parallel to the frame mounted member. The frame mounted member is secured in substantially vertical orientation to an end of a transverse support member of the frame of the agricultural implement. A stub axle is secured substantially perpendicularly to a face of the wheel mounting member remote from the transverse support member with a ground engaging wheel rotatably mounted on the stub axle. An expandable jack is mounted to the top of the transverse support member. Upon expansion of the jack a force is exerted upon an upper connecting member causing the parallelogram frame to pivot until a first end of the upper connecting member to which the end of the transverse support member is attached is raised relative to a second end of upper connecting member. Upon contraction of the jack a force is exerted upon the upper connecting member causing the parallelogram frame to pivot until the first end of upper connecting member to which the end of the transverse support member is attached is lowered relative to the second end of upper connecting member.

2 Claims, 2 Drawing Sheets

5,477,930

MECHANISM FOR ADJUSTING THE HEIGHT OF A FRAME OF AN AGRICULTURAL IMPLEMENT RELATIVE TO A GROUNDSURFACE

The present invention relates to a mechanism for adjusting the height of a frame of an agricultural implement relative to a groundsurface.

BACKGROUND OF THE INVENTION

There are a variety of alternative mechanisms for adjusting the height of a frame of an agricultural implement relative to a groundsurface. The problem with most of such mechanisms is that they are unduly complex, which makes them more expensive and increases maintenance costs.

SUMMARY OF THE INVENTION

What is required is a comparatively simple mechanism for adjusting the height of a frame of an agricultural implement relative to a groundsurface.

According to the present invention there is provided a mechanism for adjusting the height of a frame of an agricultural implement relative to a groundsurface which includes, in combination, a ground engaging wheel and a transverse support member of a frame of an agricultural implement. The transverse support member has a top and an end. A parallelogram frame is provided which includes a frame mounted member, a wheel mounting member parallel to the frame mounted member, an upper connecting member having a first end pivotally connected to the frame mounted member and a second end connected to the wheel mounting member, and a lower connecting member parallel to the upper connecting member and pivotally connected to the frame mounted member and the wheel mounting member. The frame mounted member is secured in substantially vertical orientation to the end of the transverse support member. A stub axle is secured substantially perpendicularly to a face of the wheel mounting member remote from the transverse support member with the ground engaging wheel rotatably mounted on the stub axle. An expandable jack is provided having a first end and a second end. The first end is mounted to the top of the transverse support member. The second end is attached to a projection on the upper connecting member. Upon expansion of the jack a force is exerted upon the upper connecting member causing the parallelogram frame to pivot until the first end of upper connecting member to which the end of the transverse support member is attached is raised relative to the second end of upper connecting member. Upon contraction of the jack a force is exerted upon the upper connecting member causing the parallelogram frame to pivot until the first end of upper connecting member to which the end of the transverse support member is attached is lowered relative to the second end of upper connecting member.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
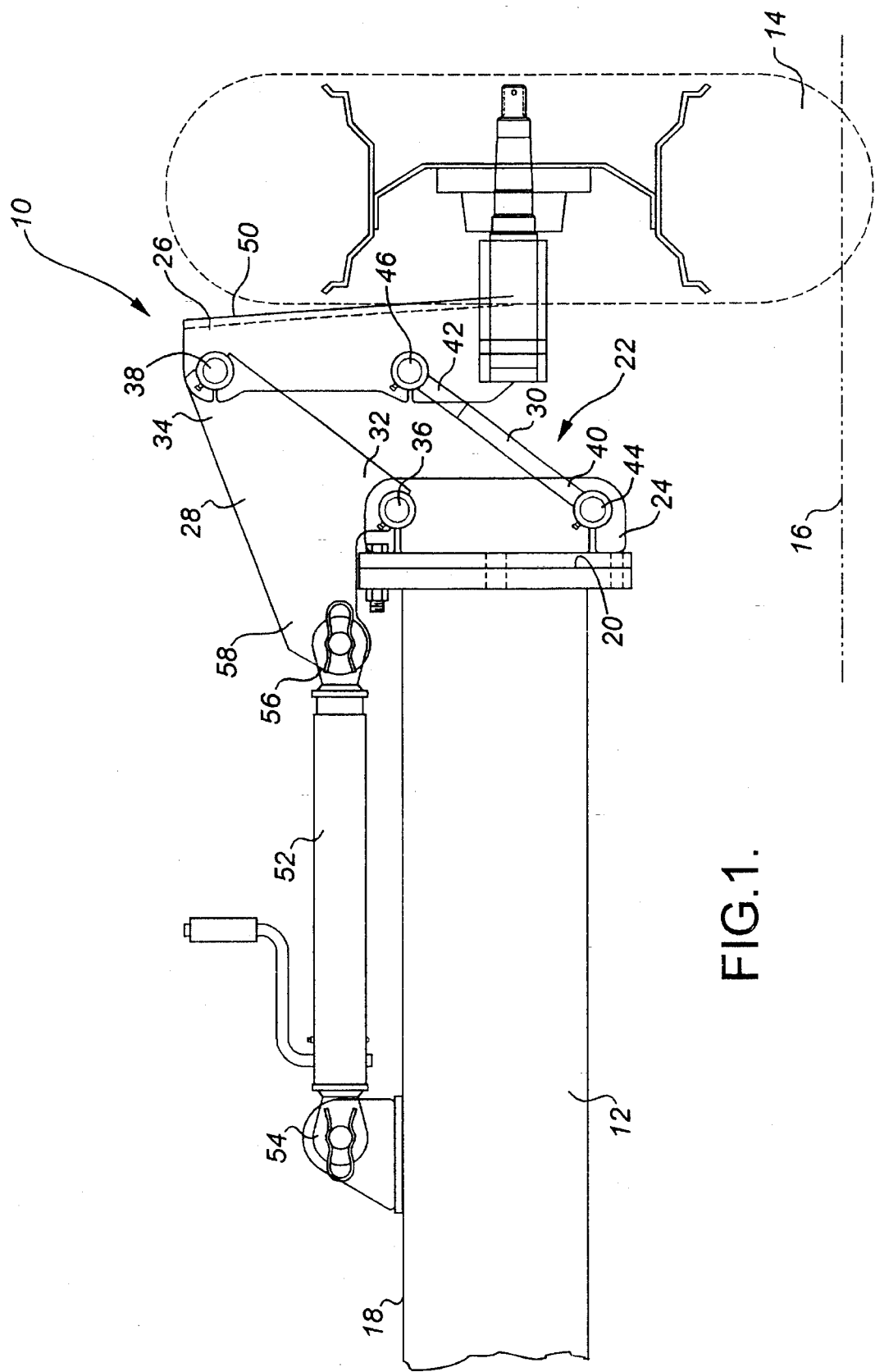
FIG. 1 is a front elevation view of a mechanism for adjusting the height of a frame of an agricultural implement constructed in accordance with the teachings of the present invention in a lowered position.

The preferred embodiment, a mechanism for adjusting the height of a frame of an agricultural implement relative to a groundsurface generally identified by reference numeral 10, will now be described with reference to FIGURES 1 and 2.

Figure 2:
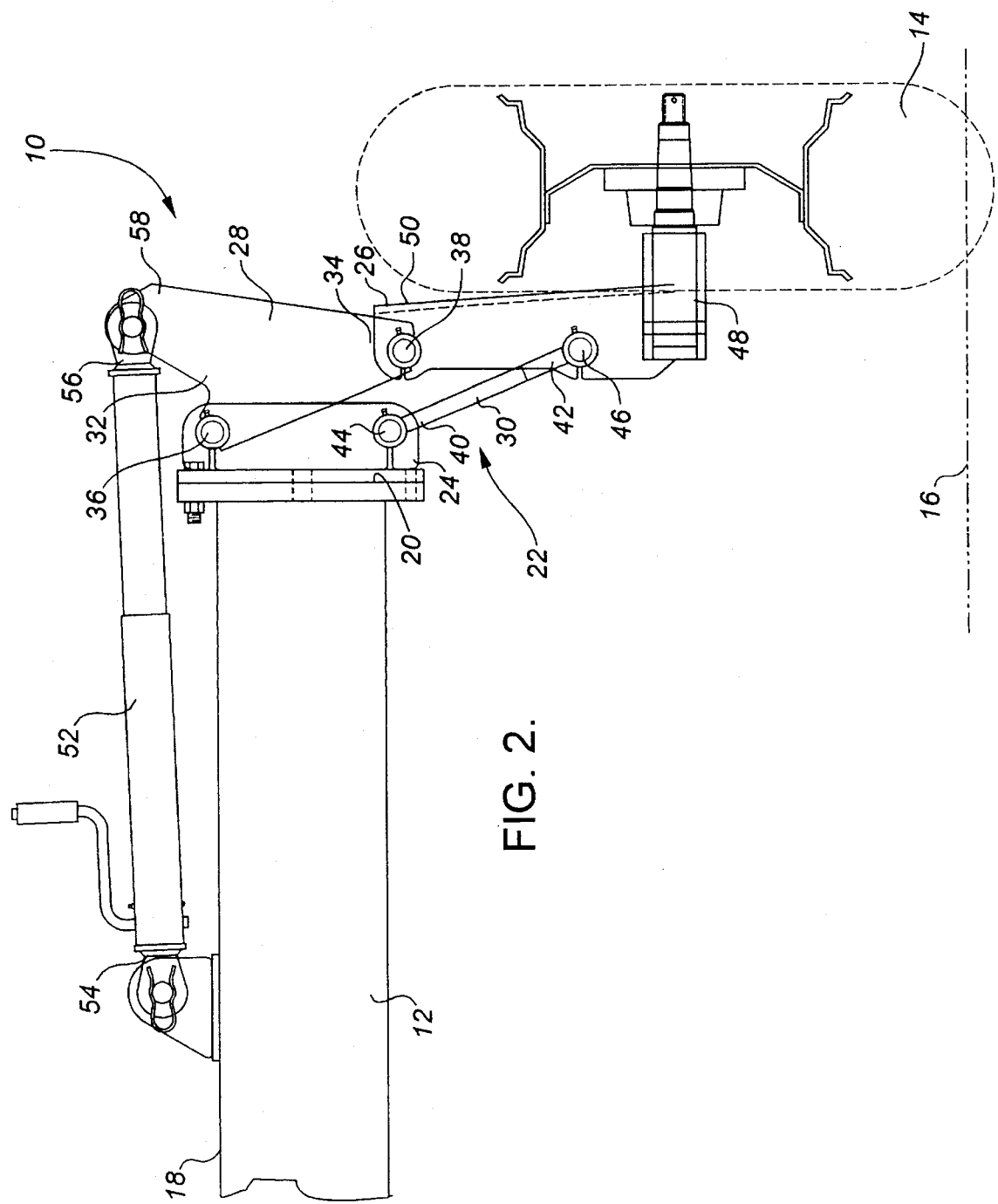
FIG. 2 is a front elevation view of a mechanism for adjusting the height of a frame of an agricultural implement constructed in accordance with the teachings of the present invention in a raised position.

Referring to FIGS. 1 and 2, there is illustrated a transverse support member 12 of a frame of an agricultural implement (not shown) and a ground engaging wheel 14 that rests upon a groundsurface 16. Transverse support member 12 has a top 18 and an end 20. A parallelogram frame, generally indicated by reference numeral 22, is provided which includes four members: a frame mounted member 24, a wheel mounting member 26, an upper connecting member 28 and a lower connecting member 30. Wheel mounting member 26 is parallel to frame mounted member 24. Upper connecting member 28 has a first end 32 and a second end 34. First end 32 is pivotally connected at pivotal connection 36 to frame mounted member 24. Second end 34 is pivotally connected at pivotal connection 38 to wheel mounting member 26. Lower connecting member 30 has a first end 40 and a second end 42. Lower connecting member 30 is parallel to upper connecting member 28. First end 40 is pivotally connected at pivotal connection 44 to frame mounted member 24. Second end 42 is pivotally connected at pivotal connection 46 to wheel mounting member 26. Frame mounted member 24 is secured in substantially vertical orientation to end 20 of transverse support member 12. A stub axle 48 is secured substantially perpendicularly to a face 50 of wheel mounting member 26 remote from end 20 of transverse support member 12. Ground engaging wheel 14 is rotatably mounted on stub axle 48. An expandable screw jack 52 is provided having a first end 54 and a second end 56. First end 54 is mounted to top 18 of transverse support member 12. Second end 56 is attached to a projection 58 on upper connecting member 28.

The use and operation of mechanism 10 will now be described with reference to FIGS. 1 and 2. Referring to FIG. 2, upon expansion of screw jack 52 a force is exerted upon upper connecting member 28 causing parallelogram frame 22 to pivot until first end 32 of upper connecting member 28 to which end 20 of transverse support member 12 is attached is raised relative to second end 34 of upper connecting member 28. Referring to FIG. 1, upon contraction of screw jack 52 a force is exerted upon upper connecting member 28 causing parallelogram frame 22 to pivot until first end 32 of upper connecting member 28 to which end 20 of transverse support member 12 is attached is lowered relative to second end 34 of upper connecting member 28.

It will be apparent to one skilled in the art that modifications may be made to the illustrated embodiment without departing from the spirit and scope of the invention as hereinafter defined in the Claims.

The embodiments of the invention in which an exclusive property or privilege is claimed are defined as follows:

1. A mechanism for adjusting the height of a frame of an agricultural implement relative to a ground surface, comprising in combination:

a ground engaging wheel;

a transverse support member of the frame of the agricultural implement, the transverse support member having a top and an end;

a parallelogram frame including a frame mounted member, a wheel mounting member parallel to the frame mounted member, an upper connecting member having a first end pivotally connected to the frame mounted member and a second end connected to the wheel mounting member, and a lower connecting member parallel to the upper connecting member and pivotally connected to the frame mounted member and the wheel mounting member, the frame mounted member being secured in substantially vertical orientation to the end of the transverse support member, a stub axle being secured in a fixed position directly to the wheel mounting member with the stub axle extending substantially perpendicularly to a face of the wheel mounting member remote from the transverse support member with the ground engaging wheel rotatably mounted on the stub axle; and an expandable jack having a first end and a second end, the first end being mounted to the top of the transverse support member and the second end being attached to a projection on the upper connecting member such that upon expansion of the jack a force is exerted upon the upper connecting member causing the parallelogram frame to pivot until the first end of upper connecting member to which the end of the transverse support member is attached is raised relative to the second end of upper connecting member and upon contraction of the jack a force is exerted upon the upper connecting member causing the parallelogram frame to pivot until the first end of upper connecting member to which the end of the transverse support member is attached is lowered relative to the second end of upper connecting member.

2. The mechanism for adjusting the height of a frame of an agricultural implement relative to a ground surface as defined in claim 1, wherein the frame mounted member, the wheel mounting member, the upper connecting member and the lower connecting member are substantially equal in length.

* * * * *